Jan. 1, 1929.

F. PROSCHKO

DOUBLE SALTS OF CARBOXYLIC ACIDS OF AROMATIC SULPHONIC HALOGEN ALKALI AMIDES AND PROCESS FOR MANUFACTURING SAME

Filed Jan. 16, 1926

FRANZ PROSCHKO
INVENTOR

By *(signature)*
his ATTY.

Patented Jan. 1, 1929.

1,697,139

UNITED STATES PATENT OFFICE.

FRANZ PROSCHKO, OF VIENNA, AUSTRIA, ASSIGNOR TO ESSEFF CHEMISCHE INDUSTRIE- UND HANDELS-AKTIENGESELLSCHAFT, OF LINZ, AUSTRIA.

DOUBLE SALTS OF CARBOXYLIC ACIDS OF AROMATIC SULPHONIC HALOGEN-ALKALI-AMIDES AND PROCESS FOR MANUFACTURING SAME.

Application filed January 16, 1926, Serial No. 81,646, and in Austria February 25, 1925.

My present invention relates to a process for producing double salts of certain carboxylic acids, and to the product resulting therefrom.

In German Patent No. 390658 to von Heyden, a process is disclosed for manufacturing alkali salts of aromatic sulphonic halogen amides, which process is based on certain publications of Kastle, Keiser, Bradley, Chatteway, and Dakin.

The present invention contemplates the employment of the carboxylic acids as a basis instead of sulphonic amides. In accordance with my invention, the course of the reaction is essentially different, and the product I obtain is a double salt, viz, an alkali-earth-metal alkali-metal double salt of the sulphonic halogen amide.

This product is much more readily soluble than the previous product, and for this and other reasons its use as a disinfectant has marked advantages over other products utilized for the same purpose. Accordingly, the present invention constitutes a notable step forward with respect to the disclosure above referred to.

I have found that in the treatment of an organic halogenated calcium salt with alkali-metal salts, substitution does not take place at the calcium atom of the carboxyl group, and accordingly it is possible to produce a double salt of the character referred to, i. e., a salt of the halogen alkali amide.

In the drawings, wherein I have endeavored to explain the reaction by graphic formulæ,—

Figure 1:
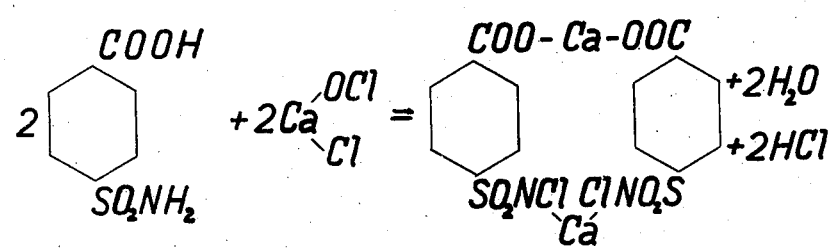
Fig. 1 illustrates the method of formation of the halogenated calcium salt.
Figure 2:
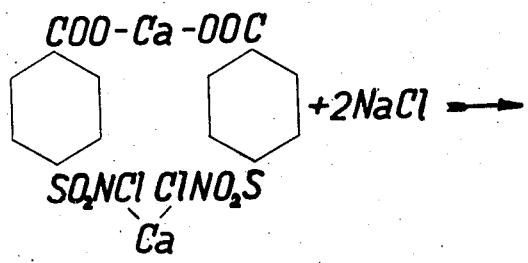
Fig. 2 illustrates the method of formation of the double salt.
Figure 2:
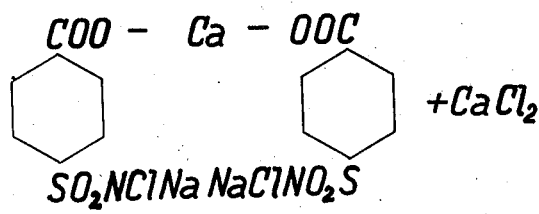

In Fig. 1 I have shown that by treating parasulphonic-amino-benzoic acid with hypochlorite of calcium ($CaOCl_2$), a chlorinated calcium salt is obtained. By then treating this intermediate product with an alkali-metal salt such as sodium chloride, as shown in Fig. 2, calcium chloride is liberated and the final product indicated results.

The final product is an almost purely white, pulverulent substance which is odorless both in dry state and in aqueous solution. Its application, either dry or in aqueous solution, to surfaces covered with oxidizable substances (such as dirty hands) is accompanied at once by the odor of hypochlorous acid.

The product is readily soluble in cold water and still more readily soluble in hot water. Its aqueous solution discolors litmus pretty rapidly. Dilute hydrochloric acid will precipitate from the aqueous solution parasulphonic chlorine amino benzoic acid as a white precipitate. Ammonium oxalate will precipitate calcium oxalate. Concentrated mineral acids will cause hypochlorous acid to be evolved therefrom.

The product is insoluble in alcohol, benzol, and the other usual organic solvents. When heated to 300 degress C. it neither melts, discolors nor decomposes. Its molecular weight, with three molecules of water, is 607.

The following are two practical examples of the process:—

Example I.

97.5 kilograms of calcium hypochlorite and 600 liters of water are thoroughly stirred for several hours in an earthenware tank. The mass is then left to stand until the liquid is partly clarified. 150 kilograms of parasulphonic amine benzoic acid are then gradually introduced under continuous agitation. When solution has been completed, the liquid is filtered through asbestos cloth, and to the clear filtrate 500 grams of sodium acetate are added to effect the formation and precipitation of the double salt. When the deposition is complete, the whole is filtered through an asbestos cloth. The residue is then freed from adhering liquid by suction and is allowed to dry in vacuo.

Example II.

104.6 kilograms of calcium hypochlorite are stirred in 600 liters of water for several hours, and the whole is then left standing for about five hours to allow mechanical impurities to deposit. Into the pretty clear solution, 150 kilograms of paratoluyl sulphonic acid are gradually added, during which time the mass is continuously stirred. After this is dissolved, the whole is filtered through an asbestos cloth. Thereupon, to effect the formation and deposition of the double salt, 354 kilograms of common salt are added to the clear liquid, stirring the latter continuously. After the separation is complete, and after again filtering through asbestos cloth, the deposit is freed by suction from adhering liquid, and is then allowed to dry in vacuo at a temperature of from 80 to 100 degrees C. The reaction product:

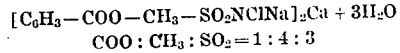

is a crystalline white powder soluble in the same manner as the corresponding composition of sulphonic amino benzoic acid.

The output is 94% of the theoretical.

What I claim is:—

1. The herein described process for manufacturing alkaline-earth-metal salts of the carboxylic acids of aromatic sulphonic halogen-alkali-amides, which comprises treating aromatic sulphonic amido carboxylic acids with alkaline-earth-metal hypohalogenites, and then treating the alkaline-earth-metal salt thus produced with alkali-metal salts, whereby an alkaline-earth-metal alkali-metal double salt is obtained.

2. The herein described process for manufacturing alkaline-earth-metal salts of the carboxylic acids of aromatic sulphonic chlorine-alkali-amides, which comprises treating aromatic sulphonic amido carboxylic acids with alkaline-earth-metal hypochlorites, and then treating the alkaline-earth-metal salt thus produced with alkali-metal salts, whereby an alkaline-earth-metal alkali-metal double salt is obtained.

3. The herein described process for manufacturing calcium salts of the carboxylic acids of aromatic sulphonic chlorine-alkali-amides, which comprises treating aromatic sulphonic amido carboxylic acids with calcium hypochlorite, and then treating the calcium salt thus produced with alkali-metal salts, whereby a calcium alkali-metal double salt is obtained.

4. As a new article of manufacture, alkaline-earth-metal salts of the carboxylic acids of aromatic sulphonic-halogen-alkali-amides.

5. As a new article of manufacture, alkaline-earth-metal salts of the carboxylic acids of aromatic sulphonic-chlorine-alkali-amides.

6. As a new article of manufacture, calcium salts of the carboxylic acids of aromatic sulphonic-chlorine-alkali-amides, having the following formula:

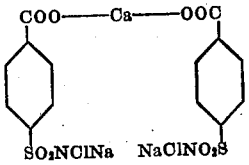

7. As a new article of manufacture, alkaline earth metal-alkali metal double salts of the carboxylic acids of aromatic sulphonic-halogen-alkali-amides.

8. As a new article of manufacture, alkaline earth metal-alkali metal double salts of the carboxylic acids of aromatic sulphonic chlorine alkali amides.

In testimony whereof I affix my signature.

Dr. FRANZ PROSCHKO.